March 22, 1932. J. S. KLECZEWSKI 1,850,463
BAKING PAN
Filed July 2, 1930
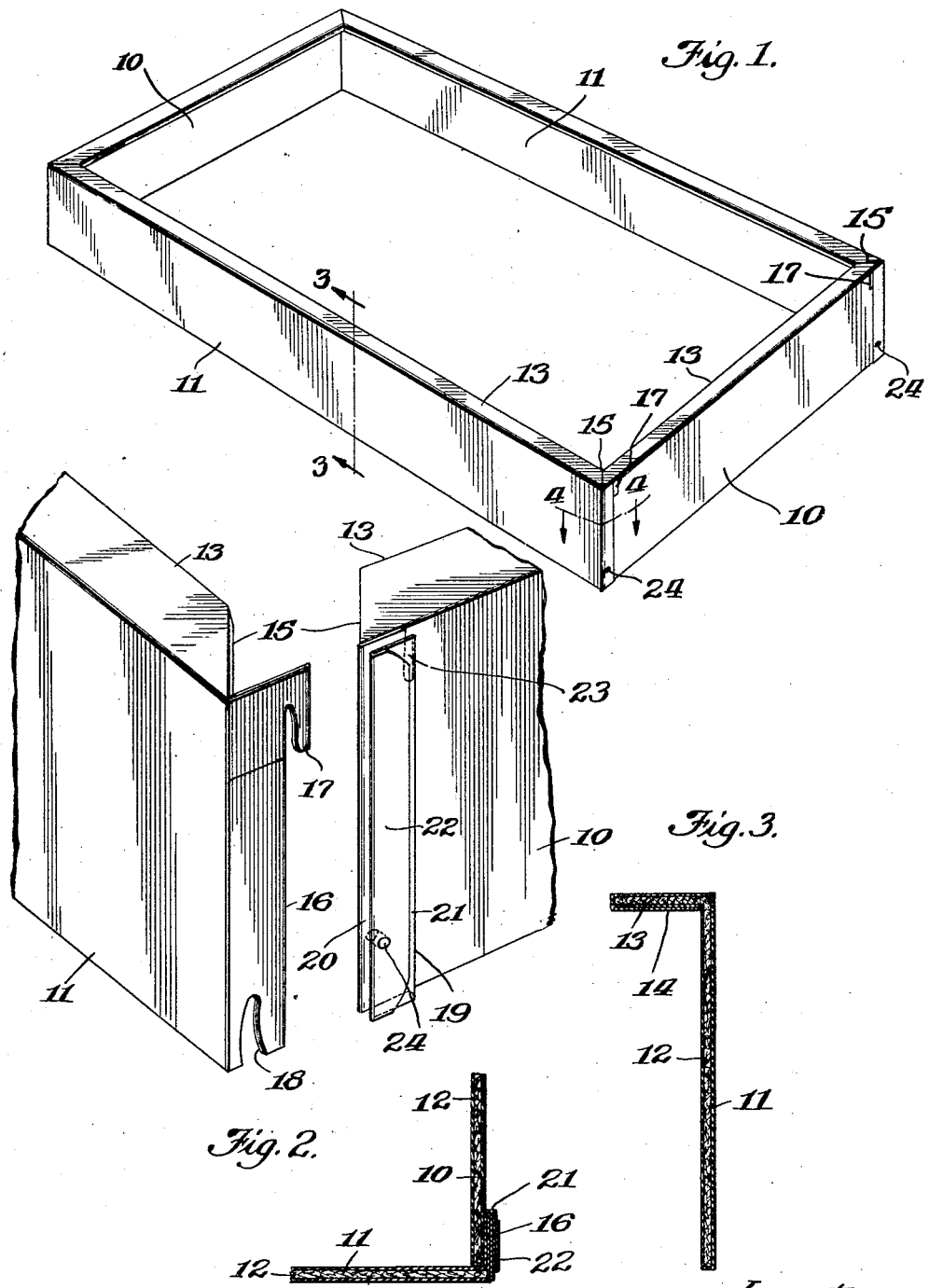
Inventor
J. S. Kleczewski
By B. Pelechowicz
Atty.

Patented Mar. 22, 1932

1,850,463

UNITED STATES PATENT OFFICE

JOHN S. KLECZEWSKI, OF CHICAGO, ILLINOIS

BAKING PAN

Application filed July 2, 1930. Serial No. 465,258.

The present invention relates to baking pans and has for its object the provision of a pan having collapsible sides.

Another object of the invention is the provision of a pan wherein the sides have asbestos filler for preventing burning of the baked article.

A still further object of the present invention is the provision of a baking pan of the character indicated wherein the sides of the pan may have horizontal inwardly disposed flanges for preventing the burning of the food at the edges adjacent the sides of the baking pan.

A still further object of the present invention is the provision of suitable locking means between the sides of the baking pan.

With the above general objects in view and others that will appear as the invention is better understood, the same consists in the novel construction, combination and arrangement of parts hereinafter more fully described, illustrated in the accompanying drawings and pointed out in the appended claims.

In the drawings forming a part of this application, and in which like designating characters refer to corresponding parts throughout the several views, Fig. 1 is a perspective view of the baking pan;

Fig. 2 is an enlarged elevational view of the ends of the two adjacent sides of the pan showing the locking means therebetween;

Fig. 3 is a cross-sectional view on line 3—3 of Fig. 1; and

Fig. 4 is a cross-sectional view on line 4—4 of Fig. 1.

Referring in detail to the present drawings there is shown therein a pair of shorter sides 10 and a pair of longer sides 11, constituting the present invention.

Each of said sides is made of a single sheet of metal suitably formed to assume an L-shaped formation on cross-section as seen on Fig. 3. Said sheet of metal constitutes an envelop for asbestos filler 12. When thus formed each side will provide the side proper and a flange 13, the two meeting edges of the metal sheet envelop overlap each other as at 14 and constitute the bottom face of flange 13.

The meeting edges of flanges 13 of the several sides 10 and 11 are beveled as at 15 for effecting the uniformity and proper fit at the corners between the several flanges 13 when the sides are in assembled formation in the baking pan, as seen on Fig. 1.

Referring to the locking means between the several sides, integrally formed with each end of the longer sides 11, and disposed at right angle with respect thereto, is plate 16 with hook 17 at its upper end and slot 18 at its lower end. These plates 16 are made from the surplus material extending from the outer faces of each of sides 11 and by doubly bending it for strengthening the same.

The ends of the shorter sides 10 are each provided with staple plate generally indicated by 19, said staple plate being integrally formed with the outer face of the metallic envelope constituting said sides 10. Said staple plate 19 includes leaf 20 folded upon said outer face, and thereupon bent into reverse direction effecting loop 21, from which the outer leaf 22 doubly folded is bent to assume parallel relation with leaf 20. At the upper end of loop 21 recess 23 is provided and adjacent the lower end and near their open edges two leaves 20 and 22 are rigidly connected by pin 24.

By virtue of the foregoing construction of said locking means the adjacent ends of the sides may be connected by placing hook 17 beyond the edge of loop 21, the neck portion of hook 17 or the stem portion thereof immediately projecting from plate 16 will rest within recess 23, while the hook 17 proper will depend and engage portion of loop 21 immediately below said recess 23. At the same time pin 24 will be brought within the upper termination of slot 18. In order to engage plate 16 within the staple plate 19, plate 16 is entered into staple plate 19 from an upward direction. Thus hook 17 and slot 18 will simultaneously engage recess 23 and pin 24, respectively.

It is to be understood that the locking means aforesaid may also be employed with a baking pan which has one, usually round, contiguous side wall, wherein the ends of the wall may be connected by the locking means aforesaid.

While there is described herein a preferred embodiment of the present invention, it is nevertheless to be understood that minor changes may be made therein without departing from the spirit and scope of the invention as claimed.

What I claim as new is:

1. A baking pan comprising a plurality of sides, staple plates at the ends of some of said sides, pins at the lower ends of said staple plates, and plates integrally formed with the ends of the remaining sides, said latter plates being provided with hooks at their upper ends and with slots at the lower ends, said hooks being adapted to engage the upper ends of said staple plates, said pins being adapted to enter within said slots.

2. A baking pan comprising a plurality of detachable sides, pins secured to the lower ends of some of said sides, recesses formed in the upper ends of the latter sides, hook shaped portions formed at the upper ends of the remaining sides and having notches formed in the lower ends thereof, said hook shaped portions being adapted to engage in said recesses and said pins being adapted to enter within said notches to detachably secure said sides together.

3. A baking pan comprising a plurality of detachable sides, pins secured to the ends of the sides, recesses formed in the ends of the latter sides in spaced relation to said pins, hook shaped portions formed at the ends of the remaining sides and having notches formed therein in spaced relation to said hook shaped portion, said hook shaped portions being adapted to engage in said recesses and said pins being adapted to enter within said notches to detachably secure said sides together.

4. A baking pan comprising a plurality of sides, at least one of said sides having a pin secured at one end thereof and a recess in spaced relation to said pin formed at the same end, a hook shaped portion formed in the contiguous end of the adjacent side, and a notch formed in said latter side in spaced relation to said hook shaped portion, said hook shaped portion being adapted to engage in said recess and said pin being adapted to enter within said notch to detachably secure said sides together.

In testimony whereof I affix my signature.

JOHN S. KLECZEWSKI.